Sept. 28, 1943.  L. A. TROFIMOV  2,330,397
VARIABLE SPEED POWER UNIT
Filed March 16, 1942

INVENTOR.
Lev A. Trofimov
BY Harry P. Canfield
ATTORNEY

Patented Sept. 28, 1943

2,330,397

UNITED STATES PATENT OFFICE 2,330,397

VARIABLE-SPEED POWER UNIT

Lev A. Trofimov, Willoughby, Ohio

Application March 16, 1942, Serial No. 434,809

8 Claims. (Cl. 74—286)

This invention relates to power units and particularly to units of the class in which power from a power source is transmitted at variable speed to a driven load.

It has heretofore been proposed to transmit power from a power source, such as a motor, to a driven load, through a transmission device of the type comprising a drive shaft and a driven shaft connected together by a variable speed-ratio mechanism. Various types of variable speed-ratio mechanisms have been devised for this purpose. One such device comprises a pair of pulleys, a belt running over the pulleys, and mechanism to change the effective relative diameters of the pulleys, to thereby vary the speed ratio at which the power is transmitted, and therefore, the speed at which the load is driven.

Such belt-and-pulley devices utilize in some cases, smooth cone pulleys and a friction driven belt, and in other cases toothed pulleys and a belt in the form of a chain.

Other types of such devices comprise a cone or cones and an annulus in direct contact with the cones, the speed ratio being varied by shifting the cones and annulus bodily relatively; others comprise an annulus instead of a belt, engaging double cone pulleys the relative diameter of which is adjusted.

In prior power transmissions comprising devices of this type, the entire power is transmitted through the device, and therefore, there is a practical limit to the range of speeds at which the load can be driven, because there is a minimum below which the diameter of the cones or of the smaller of the two pulleys cannot be reduced, and therefore a practical limit to the speed ratio adjustment. Also, as is well known, the efficiency of transmission through such devices is low, particularly when adjusted to have a relatively great ratio of transmission, and particularly when running at high speed. Also, there is a low practical limit to the amount of torque which can be transmitted through such devices.

It is with the foregoing objections to transmissions of this type in mind, that my invention has been made, and the primary object thereof is to provide a transmission of this type in which these objections are overcome.

To this end I have provided, as will appear more fully hereinafter, a power transmission unit comprising among other things a variable-speed-ratio device, through which power from a constant speed source, such as an electric induction motor, may be transmitted to a power delivery shaft, at variable speed over a wide range of speeds including zero speed; and this for a relatively small range of speed-ratio adjustments of the device; and in which the horse-power transmitted by the device itself may be less than the total horse-power transmitted to the power delivery shaft, whereby the efficiency of transmission through the device itself is high, and the power loss therethrough is correspondingly low. In attaining these improved results, I provide a differential gearing associated with the device in what I believe to be a novel manner.

Other objects of my invention are:

To provide generally an improved power transmission unit;

To provide in a power transmission unit for transmitting power from a power source to a load and of the type comprising a variable-speed-ratio device, improved means by which a greater range of speed transmission between the source and the load may be attained than is possible in the device itself;

To provide in a power transmission unit of the type comprising, as an element thereof, a variable-speed-ratio device, means by which only a part of the power will be transmitted through the device, whereby the device may be of small size and low cost, and whereby it may operate at high power transmission efficiency;

To provide a power transmission unit of the type comprising a variable-speed-ratio device associated with a differential gearing, by which the speed of the delivered power may be varied, upon adjusting the speed ratio of the device, down to zero speed and up to a maximum speed over a wide speed range;

To provide a power transmission unit by which power from a constant speed power source, such as a constant speed electric motor, may be transmitted to a load over a wide speed range including zero speed and a high maximum speed, in an improved manner;

To provide a power transmission unit by which power from a constant speed source, such as a constant speed electric motor, may be transmitted to a load at a high maximum speed and through a gradual range of speeds down to zero speed, by adjustment of the speed ratio of a variable-speed-ratio device through a relatively narrow range of adjustments;

To provide a power transmission unit by which power from a motor may be transmitted to a variable load with the output of the motor varying less than the load whereby the motor may operate at a more nearly constant load and at correspondingly improved efficiency;

To provide a power transmission unit having means for effecting improved efficiency of transmission.

Other objects will be apparent to those skilled in the art to which my invention appertains.

My invention is fully disclosed in the following description taken in connection with the accompanying drawing in which, Fig. 1 is a view, in some respects diagrammatic, of an apparatus embodying my invention in one form;

While the invention is applicable to the utilization of various types of variable-speed-ratio devices as will become apparent, I have chosen to illustrate and describe it in connection with a device of the belt and double-cone pulley type.

Figure 1:
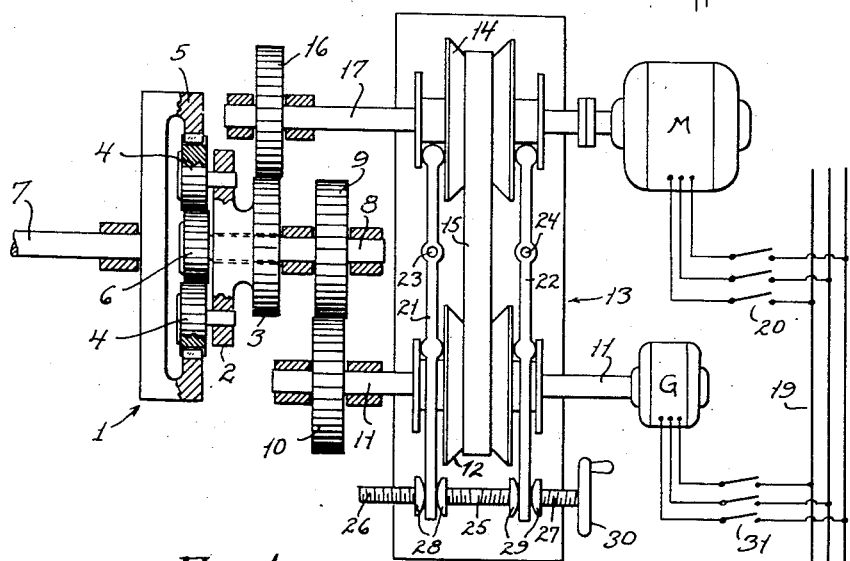

Referring to the drawing, Fig. 1, a differential gearing of the so-called planetary type is illustrated in diagrammatic form generally at 1, and comprising a spider element 2, a gear 3 connected thereto, the spider rotatably supporting differential pinions 4—4 meshed with an internal gear 5 and a sun gear 6. The internal gear 5 is connected to a power delivery shaft 7 for supplying power to any desired load to be driven.

The sun gear 6 is connected by a shaft 8 to a gear 9 meshed with a gear 10, the latter being connected by a shaft 11 to one of the pulleys 12 of a belt-and-pulley type variable-speed-ratio transmission device, indicated generally at 13, the other pulley being illustrated at 14 and the two pulleys being connected by a belt 15 running thereover.

A gear 16 meshed with the gear 3 of the spider 2 is provided on a shaft 17 which carries the pulley 14, the shaft being coupled to an electric motor M. The spider 2 and the gear 3 rotate on the shaft 8.

The differential gearing will be seen to be of the type known as a planetary gearing and while the relative diameters of the gear parts thereof may be varied, I have chosen the gears 4 and 6 as of the same diameter, the internal gear 5, therefore, being of a diameter three times as great as that of the gears 4 and 6. Also, for the sake of simplification, I have chosen the diameter of the gear 3 to be the same as the diameter of the circle coinciding with the centers of the gears 4—4, that is to say, the gear 3 has the same radius as the distance from the axis of the shaft 8 outwardly radially to the axis of a gear 4.

The motor M, as illustrated in Fig. 1, is a constant speed electric motor of the induction type, although other types of motor may be used, as will become apparent hereinafter, for example an internal combustion engine; and the motor M, when it is an electric induction type of motor, is arranged to have its primary energized from three-phase alternating electric supply mains 19 upon closing a line contactor 20.

The effective diameters of the pulleys 12 and 14 are arranged to be relatively varied by the movement of levers 21 and 22 pivotally supported at 23 and 24. When the lower ends of the levers, as viewed in the drawing, are moved closer together, the diameter of the pulley 12 is increased and that of the pulley 14 is decreased and vice versa. To move the levers 21 and 22, in opposite directions for the purposes mentioned, a screw 25, having opposite threads 26 and 27, threaded into nuts 28 and 29 on the levers 21 and 22, is arranged to be rotated by a hand wheel 30, rotation of the screw propelling the levers in opposite directions through the agency of the reverse threads, in a manner that will be understood. The similarity of the device 13, comprising the pulleys, belt and levers just described, to well known commercial forms will be recognized.

At G is a motor which is also preferably of the squirrel cage induction type, arranged to be energized by the supply mains 19 upon closing a line contactor 31, the rotor of the motor G being connected to the said shaft 11. While the squirrel cage induction type motor is preferred, other types of motors may be used as will become apparent hereinafter.

In general, in the operation of the embodiment of Fig. 1, power is transmitted from the motor M to the gear 16 and thereby to the gear 3 and differential spider 2, causing the pinions 4—4 to react upon the gear 6 to thereby drive the gear 5 and the power delivery shaft 7.

Power is also transmitted in a manner to be described through the system comprising the gear 6, shaft 8, gears 9 and 10, shaft 11, pulley 12, belt 15, pulley 14 and shaft 17.

The speed of the gear 6 may be adjustably varied by varying the speed ratio of the device 13 as described.

If the device 13 is adjusted so that the gear 6 rotates at the same speed as the spider 2, the gear 5 and shaft 7 will be driven at the speed of the gear 6. If adjusted to decrease the speed of the gear 6, the gear 5 and shaft 7 will be driven faster, and vice versa.

At a predetermined faster speed of the gear 6, the gear 5 and shaft 7 will remain at rest.

The advantages which I achieve by providing the arrangement of parts of the transmission unit, as illustrated in Fig. 1, and as above described, can best be understood by analyzing the flow of power through the transmission from the motor M to the shaft 7, and the development of torque in the several rotating parts, and I find that such an analysis can be more clearly presented if the gear and pulley ratios throughout the transmission, except as to the differential gearing, are assumed to be of one-to-one ratio. It is to this end that the gears 3, 9, 10 and 16 have been illustrated as of the same diameter. To this end also, the pulleys 12 and 14 have been illustrated as having the same diameter as the said gears when adjusted to have a one-to-one ratio of diameters. Also the gear 6 and pinions 4—4 have been illustrated as of equal diameter. As will appear hereinafter, this is not necessary and is not an essential part of my invention. The diameters of these gears, as well as the diameters of the pulleys may be greatly varied.

Assuming for the purpose of discussion that at the start the pulleys are adjusted to be of the same diameter, and that the gears have the same diameter as stated, it will at once be apparent that the gears 5 and 6 of the differential gearing 1, will be constrained to rotate at the same speed as that of the spider 2. In order to drive the load shaft 7, the differential pinions 4—4 reacting on the gear 6 supply torque to the gear 5. The tangential force of the pinions 4—4 will be applied equally to the gears 6 and 5. Inasmuch as the radius of the gear 6 is one-third of that of the gear 5, the torque on the gear 6 will be one-third of that on the gear 5.

We may designate the load torque for a given load as T. Torque at the gear 5 will therefore be T. The torque at the gear 6 for torque T on the gear 5 will be ⅓ T, and the torque at the gear 3 will be 1⅓ T, the sum of the torques on the gears 5 and 6.

Assuming that the load is moving at the unitary speed S, which is the speed of the motor M, it will be assumed that at torque T the load is 1 H. P. The motor is delivering to the spider 2, so to speak, 1⅓ H. P., since the torque at the spider is 1⅓ T, but the gear 6 being connected through a one to one ratio to the shaft 17 delivers back to it at the said unitary speed S and torque ⅓ T, ⅓ H. P. leaving the difference between that and 1⅓ H. P., delivered to the load and supplied by the motor.

Thus, as will be apparent, for the one to one pulley ratio, the belt and pulley device 13 transmits only ⅓ H. P. for 1 H. P. transmitted to the load and 1 H. P. developed by the motor M.

As stated above, the speed at which the shaft 7 is driven may be varied by adjusting the device 13. If the device be adjusted until the pulley 14 is four times as great in diameter as the pulley 12, the shaft 7 will remain at rest. If adjusted until the pulley 14 is only one-fourth as great in diameter as the pulley 12, the shaft 7 will run at a speed 1¼ S. Thus a speed variation from zero speed to one and one-fourth times the speed of the motor shaft 17 may be attained with only a one to four variation of the pulleys 12 and 14.

By an analysis similar to the foregoing, it will appear that with an adjustment of the pulleys 14 to 12 to the diameter ratio of one to four, and with the load shaft 7 rotating at a speed 1¼ S, the motor M will deliver 1¼ H. P. for only 1/12 H. P. transmitted through the belt and pulley device.

The foregoing analysis is on the assumption that the motor G is not energized, the contactor 31 being open. We will now consider the effect of the motor G, with the contactor 31 closed.

At the one to one ratio of the pulleys 14 and 12 above described, the pulley 12 and shaft 11 will rotate at the said speed S, which is the synchronous speed of the motor M and also of the motor G, when both motors are squirrel cage induction motors. The motor G, therefore, will be driven idly. If, however, the device 13 be adjusted so that the pulley 14 is larger than the pulley 12 and constrains the shaft 11 to rotate at a higher than synchronous speed, the motor G will be driven as a generator and will deliver power back to the line 19 through the closed contactor 31. This power is saved at the current source, or at the supply system meter, and while this power may be said to be derived from the motor M, it is not consumed as power, being supplied back by the motor G. The power required to drive the motor G is subtracted from the power transmitted through the variable speed device 13, and it may be of correspondingly smaller size and operate correspondingly more efficiently.

Figure 3:
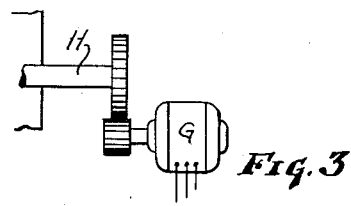
Fig. 3 is a view similar to a part of Fig. 1 or 2, illustrating a modification.

Conversely, if the device 13 is adjusted so that the pulley 12 is larger than the pulley 14, the motor G will receive power from the line 19, and it will be transmitted back through the belt 15 to the shaft 17 and for this reason I may, in some cases, prefer to gear the motor G to the shaft 11, through speed increasing gears as shown in Fig. 3; so that even at the lower speed ratio adjustments, such as, for example, as one to four, the motor G will always operate as a generator and will subtract power from that which must be transmitted by the belt back to the shaft 17.

Thus, in all cases, the power transmitted back to the shaft 17 through the belt 15 may be made considerably less than that transmitted to the shaft 17.

In further explanation of this action, it will be noted that the torque of the motor M, driving the spider 2, causes the pinions 4—4 to react on the gear 6 as upon a fulcrum by which it drives the gear 5 and shaft 7; and this causes the pinions to apply torque to the gear 6 and the gears 9 and 10 and the shaft 11; so that the power through the device 13 transmitted through the belt 15, is always in the direction from the pulley 12 to the pulley 14, at all ratio adjustments of the device 13. The power transmitted through the device 13 thus always flows from the shaft 11. If the motor G be driven as a generator above synchronous speed by the shaft 11, so that it develops electrical power, then a part of the power from the shaft 11 goes to the motor G, and only a part, the remainder, goes through the device 13.

For a complete outfit of given horsepower therefore, less power will be transmitted through the device 13 and a smaller less expensive, more efficient device 13 may be used, if the motor G be utilized and if it be driven above its synchronous speed, and to insure that it will be so driven, at all adjusted speed ratios, it may be connected to the shaft 11 as shown in Fig. 3 by speed step-up gears.

In the foregoing, it has been assumed that the motor M would run at a constant speed S when load is put thereon. As is well known, however, its speed will be slightly reduced with load on the shaft 7. This tends to cause the motor G to run at a slightly reduced speed, and if it be desired to have the motor G at all times overdriven, as a generator, the gearing shown in Fig. 3, may be determined to cause the motor G to be overdriven, even at the maximum slip or reduction in speed of the motor M under a heavy load, as well as at the low speed ratio adjustments of the device 13.

In cases in which the load 7 is of constant torque but it is desired to drive it at variable speeds, by adjusting the device 13, it will be observed that a change of speed which increases the speed of the motor G causing it to deliver more power back to the line, is added to the load supplied by the motor M, or vice versa. So that the load delivered by the motor M at various speeds of the shaft 7 will be at substantially constant horsepower, whereby an improved efficiency for the motor M is provided inasmuch as such motor will operate more efficiently through a range of speed for the driven load if the motor is always loaded than if at some speeds it is not loaded and at others heavily loaded, which is the case in the conventional variable speed drives.

From the foregoing it will be observed that speeds of the load shaft 7 may be had from zero speed up to a high maximum through a variable speed device which itself cannot and need not be adjusted over that wide a range; and that the variable speed device itself transmits less than the total load power delivered to the load; and that the load on the motor M may be kept more nearly constant than has heretofore been possible.

Figure 2:
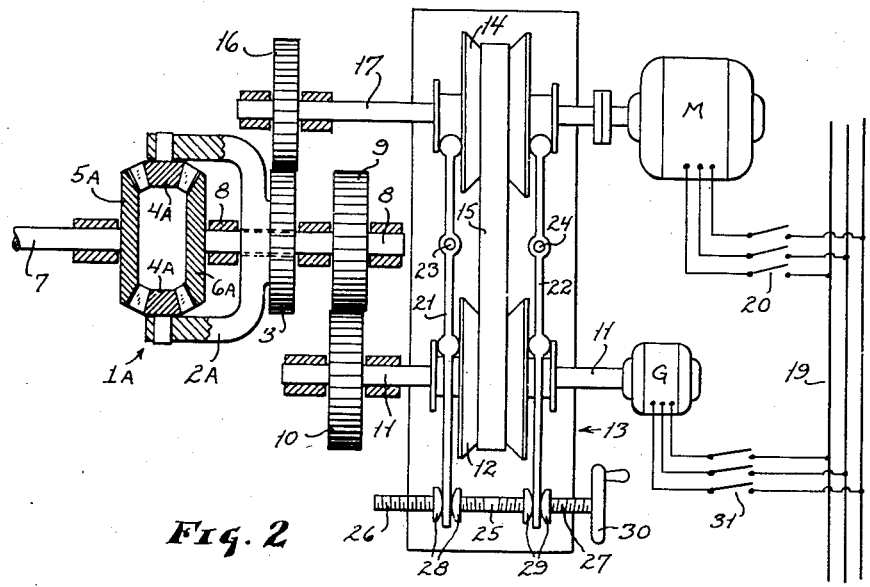
Fig. 2 is a view similar to Fig. 1, illustrating a modification.

In Fig. 2, I have illustrated my invention applied to a differential gear 1A of the so called bevel gear type, comprising a spider 2A, side gears 5A and 6A, and pinions 4A—4A, the arrangement otherwise being substantially the same as in Fig. 1.

The mode of operation of this form is substantially the same as that of the form of Fig. 1. It will be observed, however, that because of the one to one ratio in the differential gearing itself, the motor G will tend to run at lower speeds than in the form of Fig. 1, and the gearing arrangement for overdriving the motor G, illustrated in Fig. 3, will be more often desirable than in the form of Fig. 1, if the advantages above referred to of overdriving this motor are wanted. Obviously, in either the form of Fig. 1 or that of Fig. 2, the motor G may be dispensed with, or may be put out of operation by opening the contactor 31. Even in such cases, at a diameter ratio of one to four for the pulleys 14 to 12, in Fig. 1, and for 1¼ H. P. at speed 1¼ S delivered to the load shaft, the power transmitted through the belt and pulley device will be only $\frac{1}{2}$ H. P.; and in the form of Fig. 2 for 1¾ H. P. delivered to the load at speed 1¾ S, the power transmitted by the belt and pulley device is only ¼ H. P.

From this it will be apparent that some of the advantages of my invention may be enjoyed without the motor G.

It may be summarized, therefore, that in the practice of my invention, the variable speed ratio device may be of relatively lower horse-power than the delivered horse-power rating of the transmission, and therefore, the efficiency thereof will be relatively high and the cost and power loss relatively low for a given horsepower delivered to the load; and that the speed of the load may be varied from zero speed to a maximum greater even than that of the motor shaft 17.

In the foregoing, the speed of the driven load is transmitted through the gears 16 and 3 of the same diameter and reference has been made to the speed S as the motor speed. Obviously, gearing between the shaft 17 and the gear 3 may be provided to give other speeds to the load, and therefore other horsepowers at the given ratio. Also the speed of the motor M may be varied by well known means.

Also as will be apparent, different sizes and horsepowers of the motor G may be provided.

In the foregoing also I have described the transmission of my invention as adjustable to speeds of the power delivery shaft 7 down to zero speed. Obviously, for a suitable diameter ratio of the pulleys 14 and 12, the gear 3 in either the form of Fig. 1 or of Fig. 2, will rotate at a speed which will cause the shaft 7 to rotate in the reverse direction; and the foregoing analysis is intended to include reversal of the shaft 7 although, for the purposes of simplifying the explanation, speeds from zero up in only one direction have been explained in detail.

My invention is not limited to the exact details and construction illustrated and described. Changes and modifications may be made within the spirit of my invention without sacrificing its advantages and within the scope of the appended claims.

I claim:

1. In a power transmission unit, a rotary power supplying motor, a variable speed ratio power transmitting device connected to the motor, a differential gearing comprising three elements, namely, a spider element having pinions rotatably supported thereby and a pair of differential gear elements meshed with the pinions, one element being arranged to be connected to a load to be driven, the motor being connected to another element to rotatively drive it, and the third element being constrained to rotate at a speed determined by the variable speed ratio power transmission device, means to adjustably vary the speed ratio of the device, and a second motor connected to the said third element and connected to a motor power source and of a type having a speed at which it transmits no power to the said third element, and higher speeds at which it absorbs power from the third element and lower speeds at which it supplies power to the said third element, and caused to rotate at said speeds by adjusted speeds of the third element.

2. In a power transmission unit, a rotary power supplying motor, a differential gearing comprising a spider element and pinions rotatably supported thereby and a pair of differential gears meshed with the pinions, one differential gear being arranged to be connected to a load to be driven, a spider driving gear for rotatively driving the spider, a first transmission gear connected to the other differential gear, a gear rotatively driven by the motor connected to the spider driving gear, a variable speed ratio power transmission device connected to the motor, a second transmission gear constrained to rotate at a speed determined by the device and meshed with the first transmission gear, means to vary the speed ratio of the device, and a second motor connected to the said second transmission gear and connected to a motor power source and of a type having a speed at which it transmits no power to the said second transmission gear, and higher speeds at which it absorbs power from the said second transmission gear and lower speeds at which it supplies power to the said second transmission gear, and caused to rotate at said speeds by adjusted speeds of the second transmission gear.

3. In a power transmission unit, a rotary constant speed power supplying motor, a differential gearing comprising a spider element and pinions rotatably supported thereby and a pair of differential gears meshed with the pinions, one differential gear being arranged to be connected to a load to be driven, a spider driving gear, a first transmission gear connected to the other differential gear, a shaft driven by the motor, a gear connected with the shaft and meshed with the spider driving gear, a variable speed ratio power transmission device connected to the shaft, a second transmission gear constrained to rotate at a speed determined by the device and meshed with the first transmission gear, means to vary the speed ratio of the device, and a second motor connected to the said second transmission gear and connected to a motor power source and of a type having a speed at which it transmits no power to the second said transmission gear, and higher speeds at which it absorbs power from the said second transmission gear and lower speeds at which it supplies power to the said second transmission gear, and caused to rotate at said speeds by adjusted speeds of the second transmission gear.

4. In a power transmission unit, a rotary power supplying motor, a variable speed ratio power transmission device connected to the motor, a differential gearing comprising three elements, namely, a spider element having pinions rotatably supported thereby and a pair of differential gear elements meshed with the pinions, one element being arranged to be connected to a load to be driven, the motor being connected to another element to rotatively drive it, and the third element being constrained to rotate at a speed determined by the variable speed ratio power transmission device, means to adjustably vary the speed ratio of the device, and a second motor connected to the said third element and connected to a motor power source and having a speed at which it tends to transmit no power to the said third element and higher speeds at which it operates as a generator and absorbs power, and caused to rotate at said speeds by adjusted speeds of the third element.

5. In a power transmission unit, a rotary power supplying motor, a differential gearing comprising a spider element and pinions rotatably supported thereby and a pair of differential gears meshed with the pinions, one differential gear being arranged to be connected to a load to be driven, a spider driving gear for rotatively driving the spider, a first transmission gear connected to the other differential gear, a gear rotatively driven by the motor connected to the spider driving gear, a variable speed ratio power transmission device connected to the motor, a second transmission gear meshed with the first transmission gear constrained to rotate at a speed determined by the device, means to vary the speed ratio of the device, and a second motor connected to the said second transmission gear and connected to a motor power source and of a type having a speed at which it transmits no power to the said second transmission gear and higher speeds at which it operates as a power generator and absorbs power from said second transmission gear, and caused to rotate at said speeds by adjusted speeds of the second transmission gear.

6. In a power transmission unit, a rotary constant speed power supplying motor, a differential gearing comprising a spider element and pinions rotatably supported thereby and a pair of differential gears meshed with the pinions, one differential gear being arranged to be connected to a load to be driven, a spider driving gear, a first transmission gear connected to the other differential gear, a shaft driven by the motor, a gear connected with the shaft and meshed with the spider driving gear, a variable speed ratio power transmission device connected to the shaft, a second transmission gear constrained to rotate at a speed determined by the device and meshed with the first transmission gear, means to vary the speed ratio of the device, and a second motor connected to the said second transmission gear and connected to a motor power source and of a type having a speed at which it transmits no power to the said second transmission gear and higher speeds at which it operates as a generator and absorbs power, and caused to rotate at said speeds by adjusted speeds of the second transmission gear.

7. In a power transmission unit, a differential gearing comprising three elements, a variable speed ratio device, a motor for supplying power to a first element of the gearing, a power delivery shaft connected to a second element of the gearing, the variable speed ratio device being arranged to control the relative speeds of the first element and the third element of the gearing, and a power generator driven by the third element of the gearing and absorbing power therefrom.

8. In a power transmission unit, a rotary power supplying motor, a variable speed ratio power transmitting device connected to the motor, a differential gearing comprising three elements, namely, a spider element having pinions rotatably supported thereby and a pair of differential gear elements meshed with the pinions, one element being arranged to be connected to a load to be driven, the motor being connected to another element to rotatively drive it, and the third element being constrained to rotate at a speed determined by the variable speed ratio power transmission device, means to adjustably vary the speed ratio of the device, and a second motor connected to the said third element and connected to a power source and of a type having speeds at which it operates as a power generator and absorbs power from the said third element and supplies it to the source, and caused to rotate at said speeds, by adjusted speeds of the variable speed ratio device.

LEV A. TROFIMOV.